United States Patent [19]
Patton

[11] 3,982,224
[45] Sept. 21, 1976

[54] METHOD AND APPARATUS FOR TRANSMITTING DOWNHOLE INFORMATION FROM A WELL

[75] Inventor: Bobbie Joe Patton, Dallas, Tex.

[73] Assignee: Mobil Oil Corporation, New York, N.Y.

[22] Filed: Aug. 23, 1973

[21] Appl. No.: 390,828

[52] U.S. Cl. .................. 340/18 NC; 340/18 LD
[51] Int. Cl.² .................................... G01V 1/40
[58] Field of Search ......... 340/18 LD, 18 P, 18 FM, 340/18 NC; 33/306, 307

[56] References Cited
UNITED STATES PATENTS

| | | | |
|---|---|---|---|
| 3,309,656 | 3/1967 | Godbey | 340/18 LD |
| 3,789,355 | 1/1974 | Patton | 340/18 LD |
| 3,792,428 | 2/1974 | Harrell et al. | 340/18 LD |
| 3,800,277 | 3/1974 | Patton et al. | 340/18 LD |

Primary Examiner—Howard A. Birmiel
Attorney, Agent, or Firm—C. A. Huggett; Drude Faulconer

[57] ABSTRACT

The specification discloses a method and apparatus for transmitting information to the surface from a downhole location in a well. A signal generating means is positioned at the downhole location and is operated to generate an acoustical pressure wave signal of constant frequency and phase state in a liquid medium, e.g., drilling fluid present in the well. Operation of the signal generating means is temporarily altered in response to the information to be transmitted to shift the phase state of the wave signal to a second phase state to thereby encode the information into the wave signal. Operation of the signal generating means is altered in such a way so that the shift in phase state is carried out in one normal sonic period of the wave signal. This provides, when the wave signal is synchronously rectified, an effective time for the phase shift equal to zero.

27 Claims, 5 Drawing Figures

METHOD AND APPARATUS FOR TRANSMITTING DOWNHOLE INFORMATION FROM A WELL

BACKGROUND OF THE INVENTION

The present invention relates to a logging-while-drilling apparatus and method which utilize the drilling fluid as a communication link for telemetering a downhole signal to the surface and more particularly relates to a logging-while-drilling apparatus and method which include a means for encoding downhole information into an acoustical pressure wave signal by phase-shifting said signal.

The desirability of a system which is able to measure downhole drilling parameters and/or formation characteristics and transmit them to the surface while actual drilling of an earth well is being carried out has long been recognized. Several such systems have been proposed and are commonly referred to as "logging-while-drilling" systems. In logging-while-drilling systems, one of the major problems exists in finding the communication link necessary for telemetering the information from a downhole location and having it arrive at the surface in a meaningful condition.

In this regard, it has been proposed to telemeter the desired information by means of an acoustical pressure wave signal generated in and transmitted through the circulating mud system normally associated with well drilling operations. The pressure wave signal which is representative of a downhole condition is generated in the mud downhole near the bit by a signal-generating means and the wave travels up the hole through the mud to a signal processor at the surface. One logging-while-drilling system utilizing this basic type of telemetry is disclosed and fully described in U.S. Pat. No. 3,309,656 to John K. Godbey, issued Mar. 14, 1967.

In telemetering downhole information by means of an acoustical pressure wave signal carried through the mud as mentioned above, one important consideration is how the information is actually encoded into the signal. A method and apparatus is disclosed and fully described in applicant's copending United States application Ser. No. 213,061, filed December 28, 1971, now U.S. Pat. No. 3,789,355, issued Jan. 29, 1974, for encoding information to such a signal wherein the operation of the downhole signal-generating means is controlled in response to downhole information so that the signal being generated is phase-shifted to denote the information being encoded therein. The apparatus of the present invention also encodes downhole information into an acoustical pressure wave by phase-shifting said signal but utilizes different method and means within the downhole apparatus for carrying out this function.

SUMMARY OF THE INVENTION

In accordance with the present invention, there is provided a downhole, logging-while-drilling apparatus and method which telemeters downhold information to the surface by means of phase-shifting an acoustical pressure wave signal which is generated in the drilling fluid normally associated with drilling operations.

More particularly, the apparatus of the present invention has a housing which is mounted in a drill collar or the like which in turn makes up a part of a drill string of an earth drilling apparatus. A signal-generating means, i.e., a valve, having a rotor and stator is positioned on the housing so that at least a portion of the drilling fluid flowing through the drill string will flow through the valve. A motor in the housing drives the rotor of the valve through a drive train at the set speed necessary to periodically obstruct the passage of drilling fluid through the valve thereby generating in said fluid an acoustical pressure wave which has a constant defined frequency and phase state.

At least one logging transducer is associated with the tool which senses some desired downhole condition or parameter and produces an analog signal representative of same. A control unit within the tool converts said analog signal to a digital form and then utilizes the digital information to actuate an electromechanical, phase-shift means in the drive train of the tool to control operation of the rotor of said valve to thereby effect a phase shift of the acoustical pressure wave signal to reflect said digital information.

The electromechanical, phase-shift means in said drive train, when actuated, allows a change in the relative rotational speed between the motor and the rotor of the valve, thereby temporarily altering the speed at which the valve opens and closes. This alteration in speed produces a phase shift of the wave signal being generated to reflect the information being encoded into the wave signal.

Structurally, the phase-shift means includes a solenoid actuated clutch means which normally forms a positive driving connection within the drive train between the motor and the rotor of the valve. Upon impulse from the control unit within the tool, the solenoid disengages the clutch. An energy storing means which forms parts of said phase-shift means then positively drives the rotor rotationally in relation to the drive shaft of the motor so that the relative rotational speeds of the rotor shaft and the motor shaft change. After an impulse from the control unit, the solenoid is deactivated and the clutch means is immediately biased back into re-engagement to again couple the motor to the rotor so that the rotor is again driven at its set speed. Means within the drive train of the tool restores lost energy to the energy storage means and the phase-shift means is again ready to effect a change of rotor speed upon the next impulse from the control unit.

In the preferred embodiment of the present invention, the apparatus is designed to effect a defined shift of phase state of the wave signal being generated, e.g., $-180°$, in a specific time, e.g., one normal sonic period of said wave signal. This provides a wave signal wherein the effective time of the phase-shift is zero so that when the wave signal is rectified, all the signal between bit boundaries is of the same sign. This allows the rectified signal to be integrated so that all of the signal energy in each bit may be retrieved, thereby making possible the highly effective reception of the transmitted signal energy.

BRIEF DESCRIPTION OF THE DRAWINGS

The actual operation and the apparent advantages of the present invention will be better understood by referring to the drawings in which.

DESCRIPTION OF THE PREFERRED EMBODIMENT

As is well known in the art, an earth drilling apparatus (not shown) normally includes a string of pipe, i.e., drill string, which carries a drill bit at its lower end. The drill string can be rotated by power means at the surface or the drill bit can be rotated by a downhole power means, e.g., turbodrill, to effect the drilling of a well. Drilling fluid or mud is pumped down the drill string, out openings in the bit, and back to the surface through the annulus formed between the drill string and the wall of the well being drilled. The present invention relates to an apparatus which is positioned downhole in the drill string to sense and telemeter downhole information to the surface during drilling operations by means of an acoustical pressure wave generated in the drilling mud.

Figures 1, 2, 4:
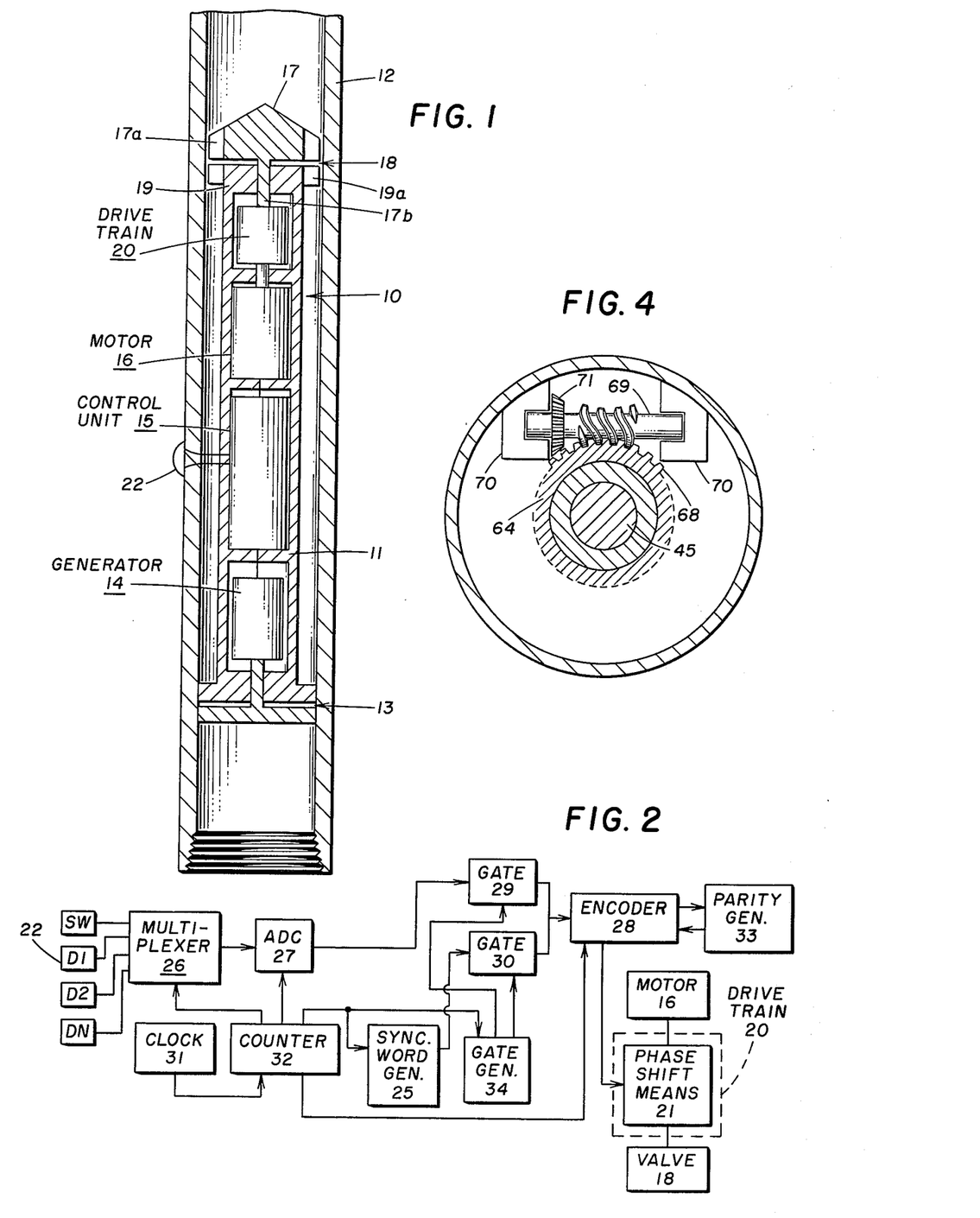
FIG. 1 is a schematical elevation, partly in section, of a logging-while-drilling apparatus in accordance with the present invention.
FIG. 2 is a schematical view of the major components of the apparatus of FIG. 1.
FIG. 4 is a partial sectional view taken along section 4—4 of FIG. 3.

Referring more particularly to the drawings, FIG. 1 discloses a logging-while-drilling apparatus 10 having a housing 11 which is positioned within drill collar 12. As is well known in the art, collar 12 is threaded at both ends so that it can be coupled into and form part of a drill string in an earth drilling apparatus. Located at the lower end of housing 11 is a mud turbine 13 which is driven by the drilling mud as it flows through collar 12 during drilling operations. Turbine 13 in turn drives electrical generator 14 which supplies the electrical power necesary for operation of apparatus 10. Electricity from generator 14 is supplied through control unit 15 to motor 16 which in turn drives rotor 17 of signal generating means, e.g., valve 18, through drive train 20.

Rotor 17 has slots 17a therethrough which when misaligned with slots 19a through stator 19 will cause the flow of drilling mud through valve 18 to be at least partially interrupted. This opening and closing of valve 18 cause an acoustical pressure wave signal to be generated in the drilling mud. The speed at which rotor 17 rotates determines certain characteristics, e.g., frequency and phase state, of the acoustical pressure wave being generated.

At least one transducer means which is capable of measuring a desired downhole condition and converting said measurement into a corresponding electrical signal is positioned downhole on or near apparatus 10. As illustrated, transducer means 22, e.g., strain gauge, is positioned on drill collar 12 to measure the downhole weight on bit. The signal from transducer means 22 is applied to control unit 15 from which it is encoded into the signal generated by valve 18.

To better understand this function, reference is made to FIG. 2 wherein major components of apparatus 10 (with emphasis on control unit 15) are illustrated in block schematic form. Control unit 15 includes a sync-word generator 25 and a plurality of logging transducers $D_1, D_2 \ldots D_N$ (one of which is transducer 22 described above) for sensing downhole conditions and producing outputs representative of such conditions. The outputs (typically analog voltage signals) from units $D_1, D_2 \ldots D_N$ are applied through a multiplexer 26 to a coder 27. The multiplexer functions to apply the analog signal to coder 27 in any suitable sequence pattern. The reference character SW identifies a channel of the multiplexer 26 associated with a sync word introduced in another part of the system from generator 25. If desired, the multiplexer may be equipped with sufficient channels so as to provide for more frequent sampling of one or more signals from units $D_1, D_2 \ldots D_N$. For example, the signal from transducer or unit $D_1$ may be applied to two input channels in the multiplexer so that this parameter is transmitted twice for each multiplexer cycle.

The coder 27 is an analog-to-digital converter which produces a digital word in response to each analog signal from transducers or detectors $D_1, D_2 \ldots D_N$. The output from coder 27 is applied to an encoder 28 by way of a multielement gate 29 and the output from sync-word generator 25 is applied to encoder 28 by way of multielement gate 30.

Sync-word generator 25 is a unit that outputs on command from clock 31 and counter 32 a predetermined word or words utilized to identify the beginning of a frame of data words. Gate generator 34 which may be of the monostable, multivibrator type outputs gating functions to open and close gates 29 and 30 in their proper sequence.

Preferably, control unit 15 is provided also with a parity generator 33 which functions to add a parity bit to the word output of encoder 28, thus providing a parity check for each word transmitted. In operation, the parity generator produces a parity bit of one state in response to an odd number of bits in a word of a given state and a parity bit of another state in response to an even number of bits in the word of the given state. For example, if an odd parity check is employed for bit values of one in a word having 10 bits, the parity generator 33 will count the number of "1's" in the word and make the eleventh bit a "1" if the number of 1's in the first 10 bits is even and a "0" if the number of 1's in the first 10 bits is odd. Thus, each word frame transmitted will contain an odd number of 1's, thus providing a check for transmission or reception errors. Encoder 28 is a parallel-in-series-out shift register which functions to convert the parallel signal from coder 27 and from sync-word generator 25 to a serial digital signal which is then applied sequentially to phase-shift means 21 in drive train 10 which will be described in detail below. The multiplexer, coder, and encoder are controlled for synchronous operation by clock 31.

Drive train 20, including phase-shift means 21 which controls the operation of rotor 17 so that the signal generated by valve 18 will be phase-shifted in response to digital signals from control unit 15, will now be described in detail. Drive train 20 (FIG. 3) is comprised of a case 40 having the output drive shaft 41 of motor 16 journaled at one end thereof. Shaft 41 has a sun gear 42 on its outer end which drives planetary gears 43 which in turn are journaled on planet carrier 44. Carrier 44 forms one end of intermediate shaft 45 which has sun gear 46 at its other end. Sun gear 46 drives planetary gears 47 on planetary carrier 48 to thereby drive rotor shaft 17b. Ring gear 49 is fixed against rotation to case 40 to cooperate with planetary gears 47, as is well known in the transmission art.

Figure 3:
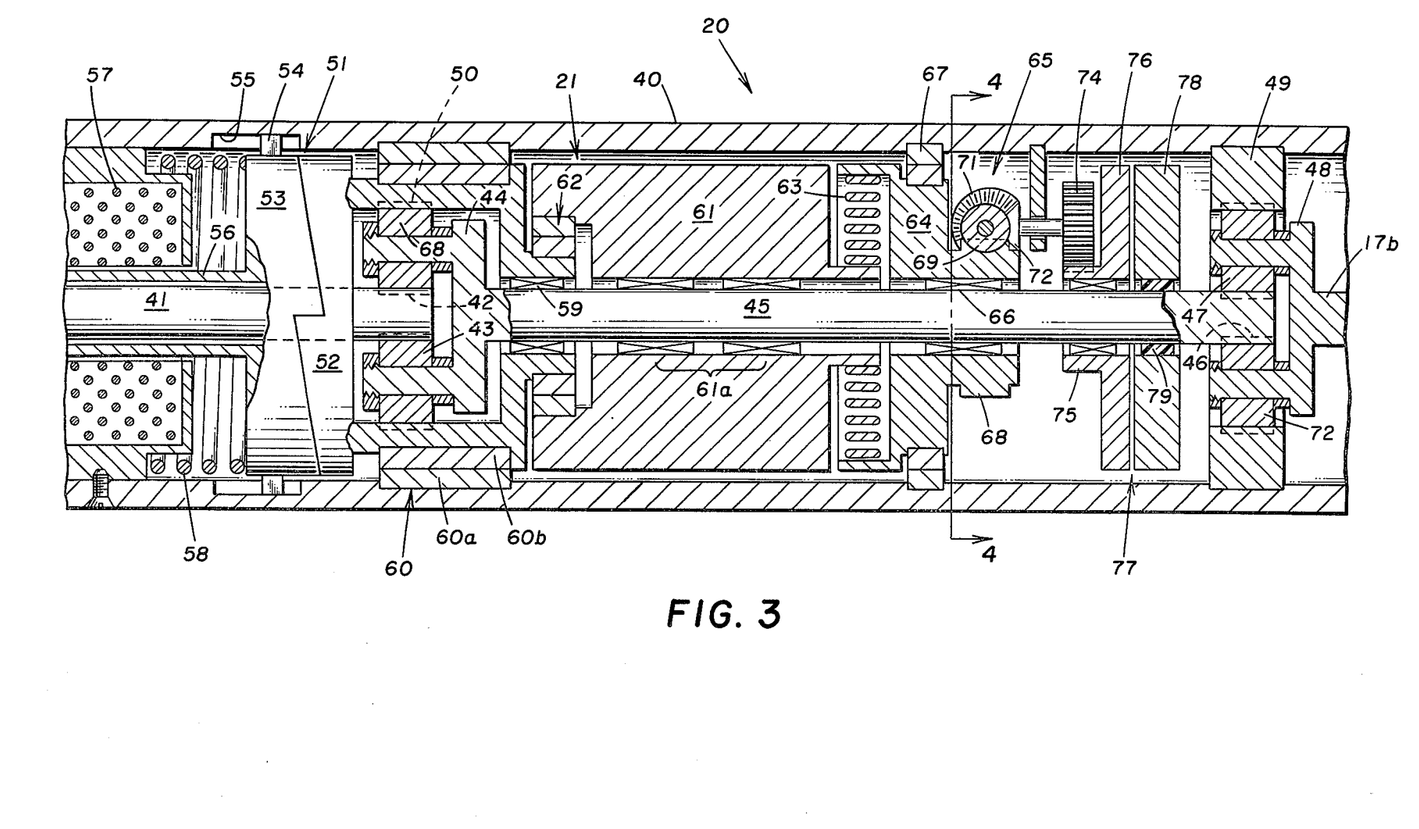
FIG. 3 is a detailed sectional view of the drive train of the apparatus of FIG. 1.

Ring gear 50 which cooperates with planetary gears 43 is fixed against rotation to case 40 by means of releasable clutch 51 which has one element 52 attached to or integral with ring gear 50. The second element 53 of clutch 51 has lugs 54 which cooperate with grooves 55 in case 40 so that element 53 can move longitudinally within case 40 but cannot rotate with respect thereto.

As illustrated, element 53 has a hollow, cylindrical extension 56 through which motor output shaft 41 passes. Solenoid coil 57 is mounted in case 40 and surrounds extension 56 which in effect forms the core of the solenoid. Spring 58 is positioned within case 40 to normally bias clutch element 53 into engagement with clutch element 52.

Ring gear 50 is connected to case 40 by means of overrunning clutch bearing means 60, the operation of which will be described later. Clutch means 60 has two elements, 60a which is attached to case 40 and 60b which is attached to ring gear 50. This type of clutch, e.g., Roller Clutch Series RC and RCB, manufactured by Torrington Company, Torrington, Connecticut, is well known in the art and is one which permits relative rotation between element 60a and 60b in one direction but forms a positive driving connection between said elements when rotated in the opposite direction. Additionally, clutch means 60 serves as a bearing to journal ring gear 50 into case 40. Intermediate shaft 45 is journaled to ring gear 50 by means of bearing 59.

An inertia element 61 of relatively great mass, e.g., a cylinder of steel or alloy, is journaled on intermediate shaft 45 by bearings 61a and is coupled to ring gear 50 by overrunning clutch means 62. Overrunning clutch means 62 operates similarly to clutch bearing means 60 in that it allows inertia element or mass 61 to rotate relative to ring gear 50 in one direction but will cause mass 61 to drive ring 50 in the other direction, as will be more fully explained in the description of operation below. Helical spring 63 is connected at one of its ends to mass 61 and at its other end to winder element 64 of winder means 65.

As seen in FIGS. 3 and 4, winder means 65 comprises winder element 64 which is journaled to case 40 by overrunning clutch bearing means 67 while bearing 66 journals element 64 to shaft 45. Winder element 64 has a toothed gear 68 around its periphery which cooperates with worm gear 69 which in turn is journaled to case 40 by bearing blocks 70. Worm 69 has bevel gear 71 integral therewith which is driven by bevel gear 72 (FIG. 3) which in turn is driven by gear 74. Means for driving gear 74 is gear 75 which forms part of one element 76 of magnetic torque coupling 77. Element 76 is journaled on shaft 45 and cooperates with a second element 78 of coupling 77 which is preferably secured to shaft 45 by a resilient means, e.g., rubber ring 79.

The operation of logging-while-drilling apparatus 10 will now be described. Apparatus 10 is positioned within drill collar 12 which, in turn, is coupled into a drill string of an earth drilling apparatus. During drilling operations, drilling mud will be circulated down through collar 12, through valve 18, and around housing 11 of apparatus 10. The flow of mud will rotate turbine 13 to drive generator 14 which supplies the electrical power necessary for the operation of apparatus 10. Power from generator 14 drives motor 16 at a set speed, which, in turn, drives rotor 17 of valve 18 in one direction through drive train 20 at a constant speed necessary to generate an acoustical pressure wave in the mud of a defined frequency, e.g., 15 Hertz.

As long as ring gear 50 is locked in position by clutch means 51 which prohibits said one-direction rotation and by overrunning clutch 60 which prohibits rotation in the other direction, the frequency and phase state of the pressure wave signal generated by valve 18 are constant.

Transducer 21 senses downhole information and feeds it to control unit 15 where the information is converted to a digital form as described above. Encoder 28 supplies a pulse to solenoid 57 in response to the digital bit to be encoded. Encoder 28 may be set to provide a pulse to phase-shift means 21 in any one of several different ways. For example, if a binary code is being used as the format for transmitting the downhole information, encoder 28 will provide a pulse to phase-shift means 21 in response to a 37 1" bit but will provide no pulse for a 0 bit. For a more detailed description of coding techniques and for a detailed description of uphole receiving apparatus and decoding techniques, see applicant's copending U.S. application Ser. No. 213,061, filed Dec. 28, 1971 now U.S. Pat. No. 3,789,355, issued Jan. 29, 1974.

The pulse from encoder 28 causes core 56 to move into solenoid coil 57 to disengage clutch element 53 from element 52. As illustrated, clutch means 51 is of a saw-tooth type having engagement surfaces or faces spaced at 180°. The pulse is of short duration but is long enough to insure complete disengagement of clutch means 51. As element 53 retracts, it engages spring 58 which opposes the solenoid action and biases element 53 back into engagement with element 52 as soon as the pulse ends. Upon disengagement of clutch means 51 and before it can re-engage, ring gear 50 through overrunning clutch 62 is propelled rapidly in said one direction by mass 61 which in turn is powered by energy stored in wound spring 63. Even though element 53 is immediately biased back into engagement with element 52, ring gear 60 will rotate 180° with relation to its previous position before the clutch surfaces or faces will re-engage. This positive, controlled movement of ring gear 50 changes the relative rotational speeds between drive shaft 41 of motor 16 and shaft 17b of rotor 17 thereby temporarily altering the speed of the rotor to shift the phase state of wave signal being generated by valve 18.

As will be explained more in detail below, helical spring 63 is wound to store energy to drive mass 61 when clutch means 51 is disengaged. When clutch means 51 disengages and spring 63 unwinds, the inertia of mass 61 will extend the spring past its null point so that when mass 61 stops, spring 63 will be under reverse tension. This reverse tension in spring 63 causes mass 61 to rotate back in the opposite direction and again the inertia of mass 61 will carry spring 63 past its null point, thereby partially rewinding spring 63 to some fraction of its original torque value, e.g., 90%. Note that overrunning clutch 62 forms a positive driving connection between ring gear 50 and mass 61 in the driving direction (said one direction) but allows relative movement therebetween in the rewinding direction.

Magnetic torque coupling 77 is set to slip when the predetermined torque necessary to fully wind spring 63 has been reached. When clutch 51 disengages and spring 63 begins to drive mass 61, the tension in spring 63 is reduced, thus reducing the torque being applied to element 76. As the torque drops below the predetermined value, the magnetic force of coupling 77 is sufficient to form a driving connection between element 76 and element 78, the latter being continuously rotated by shaft 45. Gear 75 on element 76 rotates gear 74 which drives worm gear 69 through bevel gears 71, 72.

Worm gear 69, through gear 68, rotates winder element 64 to rewind spring 63 to restore the desired amount of energy to said spring. When the desired energy is restored and the torque at element 76 reaches the predetermined value, elements 76 and 78 of magnetic coupling 77 will again slip relative to each other to cease rewinding of the spring. Worm gear 69 and gear 68 are designed to prevent reverse drive therethrough, as is well known in the mechanical art. Also, overrunning clutch 67 provides an additional lock to prevent spring 63 from unwinding through winder means 65. Since a large portion of the desired torque is restored to spring 63 by the reverse action of mass 61, winder means 65 has to operate only to restore a small portion of said desired energy to spring 63.

In the preferred embodiment of the present invention, the apparatus described above is specifically designed so that a precise phase-shift of the pressure wave signal occurs in a definitive length of time, i.e., a phase-shift of −180° is completed in one normal sonic period. As will be explained below, phase shifting the signal wave by −180° in one normal sonic period makes possible a method wherein there is a highly effective reception of the transmitted signal energy. To illustrate how this objective is accomplished, a specific example of an apparatus illustrating the generic design concepts involved will now be described.

In the apparatus of FIG. 1, rotor 17 has five slots 17a and rotates at a speed of 180 rpm to generate a signal of 15 Hz. when motor shaft 41 is rotating at a speed of 3600 rpm. To determine the movement of ring gear 50 necessary to shift the phase of the wave signal by 180°, the following relationship can be used:

$$\Delta\phi_{sonic} = \Delta\phi_{ring} \times \frac{1}{G_1} \times \frac{1}{G_2} \times N \qquad (1)$$

which rearranged is:

$$\Delta\phi_{ring} = \frac{\Delta\phi_{sonic} \, G_1 G_2}{N} \qquad (2)$$

where:

$\Delta\phi_{sonic}$ = difference in phase state of the sonic signal from what it would have been had there been no movement of ring gear 50 in degrees = 180°*, $\Delta\phi_{ring}$ = movement of ring bear 50 in degrees, $G_1$ = gear ratio from ring gear 50 to planet gears 43 = 1.25*, $G_2$ = gear ratio from sun gear 46 to planet gears 47 = 4*, N = number of slots 17a = 5*,

* = numerical values of specific example.

By substituting the numerical values into equation (2) and simplifying:

$$\Delta\phi_{ring} = 180° \times \frac{1.25 \times 4}{5} = 180° = \text{½ revolution.}$$

If $\Delta\phi_{ring}$ is in the same effective direction as the constant speed rotation of motor shaft 41, $\Delta\phi_{sonic}$ is an advance in phase state of 180°. However, in the preferred embodiment $\Delta\phi_{ring}$ is in a direction effectively opposite to the direction of the rotation of motor shaft 41 so that $\Delta\phi_{sonic}$ is retarded by 180°. As will be shown, the apparatus is designed so that the entire shift of phase state will occur in one normal sonic period. To further describe and better understand the specific example, reference is made to the time function curves illustrated in FIG. 5.

Figure 5:
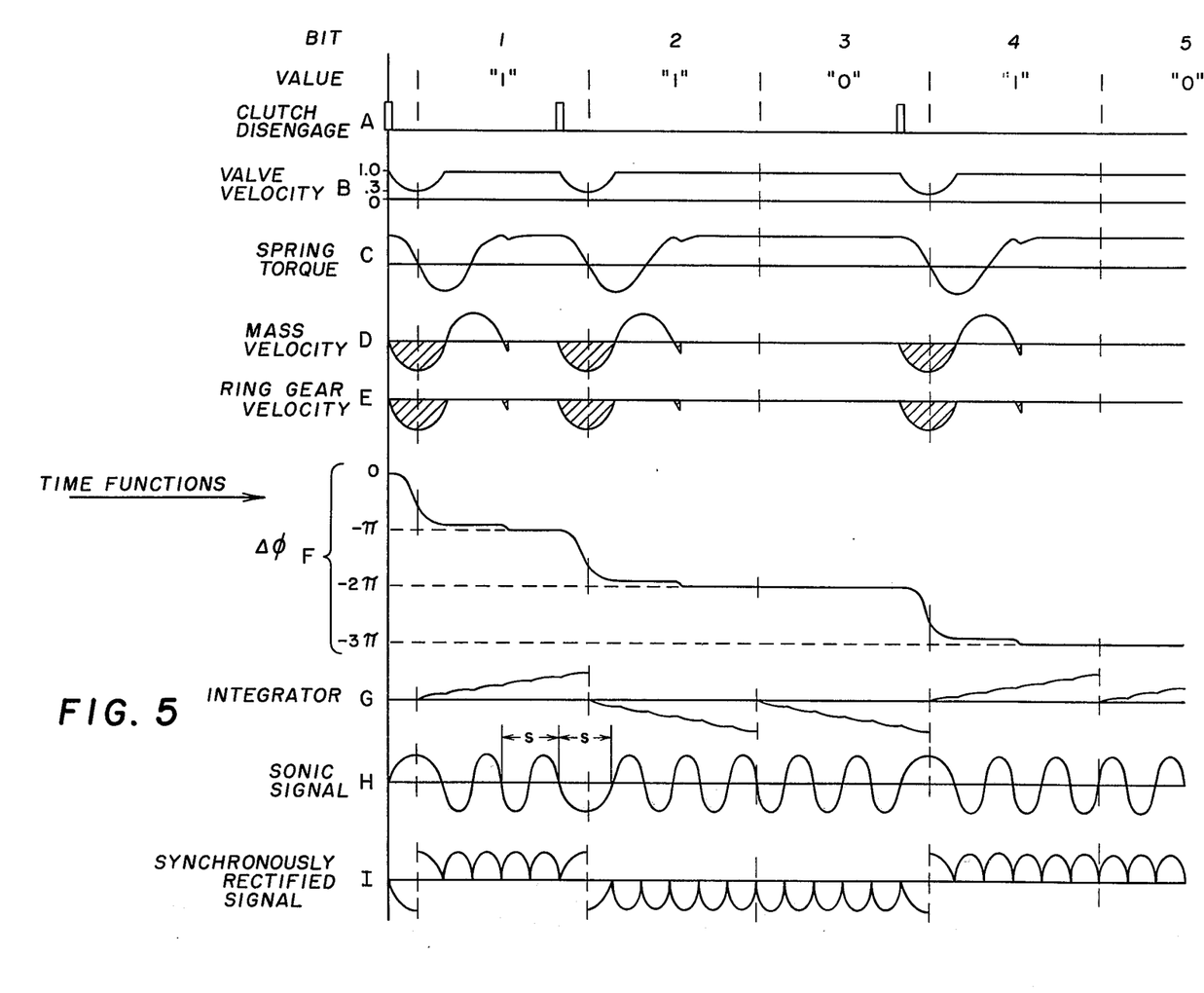
FIG. 5 illustrates time function curves of certain design criteria of a preferred embodiment of the apparatus of FIG. 1.

Upon a pulse from encoder 28 indicating a 1 bit, clutch 51 is disengaged for only the short duration (curve A) necessary to allow the clutch faces to rotate sufficiently to prevent them from re-engaging until spring 63 and mass 61 have driven ring gear 50 to a position −180° from its previous position.

To insure that the phase-shift takes place in the time of one normal sonic period s (curve H, FIG. 5), spring 63 and mass 61 have to be correlated so that ring gear 50 (curve E) is driven −180° in one normal sonic period. To do this, mass 61-spring 63 combination, which acts in the nature of a highly underdamped, harmonic oscillator, is designed to have a natural period equal to two normal sonic periods s (curve D).

The period of such an oscillator may be expressed as follows:

$$T = .042 \sqrt{\frac{I}{k}} = 2s \qquad (3)$$

where:

T = transition time in seconds,
k = spring constant in inch-pounds per degree,
I = driving mass inertia in inches²-pound,
0.042 = 2π × conversion factor to standardize units.

For a 15 Hz. signal, the time s of one normal sonic period is equal to 1/15 sec. or 0.067 sec., so by substituting in equation (3):

$$2(.067) = .042 \sqrt{\frac{I}{k}} = 0.134 \qquad (4)$$

By selecting a practical value for I which will insure that the oscillator system will restore at least 90% of the torque or energy Z (curve C) to spring 63 when the mass travels in a reverse direction, equation (4) can be solved for k. In the present example I = 20 inch²-pound and k = 2 inch-pounds per degree.

Knowing the spring constant (k = 2 inch-pound per degree) and knowing how far ring gear 50 has to be driven ($\Delta\phi_{ring}$ = 180°) the necessary tension or energy Z for spring 63 can be calculated from the following expression:

$$Z = \frac{\Delta\phi_{ring}}{2}(k) = \frac{180°}{2}(2) = 180 \text{ inch-pounds.} \qquad (5)$$

This theoretical value of stored energy will in practice produce a movement of ring gear 50 ($\Delta\phi_{ring}$) just slightly less than the actual desired amount due to normal frictional losses in the apparatus. Therefore, the spring 63 may be slightly overtorqued to make up for the frictional losses. When spring 63 has exactly the right amount of stored energy or a slight excess, the faces of clutch 51 will be assured of traveling the full −180°. If the excess energy stored in spring 63 is substantial, the faces of clutch 51 may slam into each other, causing excessive wear. To cushion any shock present when the clutch faces meet, the clutch faces themselves may include shock adsorptive material or lugs 54 may be resiliently coupled to slots 55 to compensate for said shock. However, as will be explained below, even if spring 63 is slightly underwound, the present apparatus will still function as desired.

In the latter case, as illustrated by curves C, D, E, and F, slightly underwound spring 63 and mass 61 will drive ring gear 60 to a position slightly less than −180°(−π) from its starting position (curve F). The negative torque or energy Z (curve C) then drives mass 61 (curve D) in a reverse direction to partially rewind spring 63 (curve C) while overrunning clutch 60 prevents reverse rotation of ring gear 50. When mass 61 comes to rest in the reverse direction, the partially restored energy in spring 63 will again drive mass 61 and ring gear 50 in the original direction. Now, however, since element 53 of clutch 51 has been biased back toward element 52, ring gear 50 (curves E and F) can only move the short distance necessary to gently re-engage the clutch faces of elements 52, 53. The last bit of movement by ring gear 50 is unimportant from the viewpoint of the instantaneous exact phase state, e.g., an error 18° in the specific example causes a correlated loss of signal of only 5%. However, such an error cannot be allowed to accumulate over several phase-shifts and does not in the present invention since it is automatically corrected within one normal bit interval (curve F). The energy Z in spring 63 which is lost in operation of the phase-shift means 21 is made up by winder means 65, as explained above.

The displacement of ring gear 50 temporarily changes the relative rotational speeds between motor shaft 41 and rotor shaft 17b, thereby temporarily slowing velocity of rotor 17 (curve B) which results in a precise shift in the phase state of the wave signal (curve H) being generated by valve 18. The curve H illustrates a signal where a "nonreturn to zero" coding scheme is utilized. That is, the phase of the signal is shifted only when a 1 bit is to be transmitted. The lack of any shift in phase between two bit intervals indicates that a 0 bit is being transmitted. Of course, as discussed above, other coding schemes can be used but the details of such schemes form no part of the present invention.

When the signal of curve H is synchronously rectified (curve I), it can be seen that all the signal between bit boundaries is of the same sign. This instantaneous shifting of phase state allows integration of the signal (curve G) wherein all of the signal energy in each bit may be retrieved. Since there is no loss of signal energy, the effective time of the phase-shift may be considered to be zero even though the real time of the phase-shift is one sonic period. These aspects of the present invention make possible aa relatively high data rate for the apparatus, e.g., 3 bits per second or higher.

What is claimed is:

1. A method of transmitting information from a downhole location in a well through a liquid medium in the well, said method comprising:
   generating an acoustical pressure wave signal in said liquid at a point downhole in said well, said wave signal having a constant frequency and phase state; and
   altering said wave signal in response to said information to be transmitted to shift the phase state of said signal, said shift of said phase state being carried out in a time period which produces, when said wave signal is synchronously rectified, a time for said phase state shift effectively equal to zero.

2. The method of claim 1 wherein said time period is equal to one normal sonic period of said wave signal.

3. The method of transmitting information from a downhole location in a well having a liquid medium in the well, said method comprising:
   generating an acoustical pressure wave signal in said liquid at a point downhole in said well, said wave signal having a constant frequency and phase state;
   converting said information to be transmitted into a digital word having a plurality of bits; and
   altering said wave signal in response to designated bits of said digital word to shift said phase state of said signal, said shift of said phase state being carried out in a time period which provides, when said wave signal is synchronously rectified, a time of shift of phase state which is effectively equal to zero.

4. The method of claim 3 wherein said time period is one normal sonic period of said acoustical pressure wave signal.

5. The method of claim 4 wherein said shift of said phase state of said wave signal equals −180°.

6. A logging-while-drilling apparatus comprising:
   a housing adapted to be positioned in a drill string of an earth drilling apparatus wherein a drilling fluid when circulated through the drill string will flow around said housing;
   signal generating means positioned on said housing do that at least a portion of the drilling fluid flowing through the drill string will flow through said signal generating means;
   at least one transducer means for sensing a downhole condition and producing a signal representative of said sensed condition;
   a motor in said housing adapted to run at a constant speed; and
   drive means for connecting said motor to said signal generating means so that said motor will drive said signal generating means at a set speed to thereby generate an acoustical pressure wave signal in the drilling fluid, said drive means including:
      shift means responsive to said sensed condition signal for temporarily altering said set speed of said signal generating means.

7. The logging-while-drilling apparatus of claim 6 wherein said signal generating means comprises:
   a rotary valve having a stator and a rotor, said rotor having a shaft connected to said motor by said drive means.

8. A logging-while-drilling apparatus comprising:
   a housing adapted to be positioned in a drill string of an earth drilling apparatus wherein a drilling fluid when circulated through the drill string will flow around said housing;
   a rotary valve means positioned on said housing so that at least a portion of the drilling fluid flowing through the drill string will flow through said valve, said valve having a rotor with a shaft journaled in said housing;
   at least one transducer means for sensing a downhole condition and producing a signal representative of said sensed condition;
   a motor in said housing having a drive shaft; and
   drive means for connecting said drive shaft to said shaft of said rotor so that said motor will drive said rotor at a set speed, said drive means including:
      shift means responsive to said signal representative of said sensed condition to temporarily change the relative speed between said drive shaft and said shaft of said rotor.

9. The logging-while-drilling apparatus of claim 8 wherein said drive means includes:

a transmission having a case and an input connected to said drive shaft and an output connected to said shaft of said rotor, said transmission including:
a set of planetary gears;
a ring gear cooperating with said set of planetary gears;
releasable means normally securing said ring gear to said case to prevent relative rotational movement between said ring gear and said case; and
wherein said shift means includes:
means responsive to said signal representative of said sensed condition for releasing said releasable means to allow relative movement between said ring gear and said case.

10. The logging-while-drilling apparatus of claim 9 wherein said energy storage means comprises:
spring means adapted to store a predetermined amount of energy for propelling said ring gear in a defined direction when said releasable means are released.

11. The logging-while-drilling apparatus of claim 10 wherein said energy storage means further includes:
an inertia element of relatively large mass connected between said ring gear and said spring means.

12. The logging-while-drilling apparatus of claim 11 including:
a winder means operable when the energy in said spring means drops below said predetermined amount to rewind said spring means to said predetermined amount.

13. The logging-while-drilling apparatus of claim 9 wherein said releasable means comprises:
a clutch comprising:
a first element attached to said ring gear;
a second element affixed against rotational movement with respect to said case but mounted for longitudinal movement therewith;
a spring normally biasing said first and second elements together to engage said clutch; and
means responsive to said signal representative of said sensed condition for moving said second element against the bias of said spring to disengage said clutch.

14. The apparatus of claim 13 wherein said means for moving said second element against the bias of said spring comprises:
a solenoid.

15. Apparatus adapted for transmitting data signals from a well bore to the surface and comprising:
a body adapted for connection in a pipe string and having a fluid passage arranged to carry fluids between the surface and well bore;
a first signal-producing member cooperatively arranged in said fluid passage for directing at least a portion of a fluid flowing therethrough along at least one selected flow path;
a second signal-producing member cooperatively arranged in said fluid passage adjacent to said first member for rotation to repetitively obstruct said flow path at periodic intervals for generating cyclic acoustic signals in a fluid flowing through said fluid passage; and data transmitting means including rotatable driving means, and signal-responsive coupling means intercoupling said driving means to said second signal-producing member, said coupling means being selectively operable in response to electrical data signals applied thereto for controlling the rotation of said second signal-producing member to produce at least one detectable change in the character of said acoustic signals representative of such electrical data signals.

16. Apparatus adapted for transmitting data to the surface during the drilling for a borehole and comprising:
a body adapted for connection in a tubular drill string and having a fluid passage arranged to conduct drilling fluids between the surface and borehole-drilling device dependently coupled therebelow;
a flow director cooperatively arranged for movement in said fluid passage and including at least one opening for directing drilling fluids flowing through said fluid passage along a selected axis;
a signal-producing member coaxially arranged for rotation in said fluid passage and including a plurality of alternately-disposed openings and obstructions angularly spaced from one another and respectively adapted to successively cut across said axis upon rotation of said signal-producing member for producing cyclic acoustic signals in a drilling fluid flowing through said fluid passage;
motor means adapted for rotating said signal-producing member; and
data-transmitting means including signal-responsive coupling means co-rotatively intercoupling said motor means to said signal-producing member, said coupling means being operative in response to electrical data signals applied thereto for selectively shifting said signal-producing member between selected angular orientations during the continued rotation thereof to produce detectable changes in the phase relationships of said acoustic signals representative of such electrical data signals.

17. The apparatus of claim 15 wherein said detectable change is a change in the phase relationship of said acoustic signals.

18. The apparatus of claim 15 wherein said driving means include a motor adapted to be operated at a constant speed.

19. The apparatus of claim 15 further including:
data signaling means on said body and adapted for producing said electrical data signals as an indication of at least one downhole condition.

20. The apparatus of claim 15 wherein said coupling means include:
first and second coupling members respectively coupled to said second signal producing member and said driving means;
means intercoupling said coupling members together for orienting said second signal producing member in at least two different angular positions in relation to said first signal producing member; and
actuator means responsive to said electrical data signals for selectively moving said second signal producing member between its said different angular positions to produce said detectable change in the form of a change in the phase relationship of said acoustic signals.

21. The apparatus of claim 20 wherein said driving means include a motor adapted to be operated at a constant speed.

22. The apparatus of claim 20 further including: data signaling means on said body and adapted for producing said electrical data signals as an indication of at least one downhole condition.

23. The apparatus of claim 20 further including: means cooperatively arranged on said body for supplying electrical data signals which are a function of at least one downhole condition to said coupling means.

24. Apparatus adapted for measuring at least one downhole condition while drilling a borehole and comprising:
a body tandemly coupled in a tubular drill string having a borehole drilling device dependently coupled thereto and defining a fluid passage for circulating drilling fluids between the surface and said borehole drilling device;
data signaling means on said body and adapted for producing digital data signals representative of at least one downhole condition;
acoustic signaling means on said body and including a flow directing member disposed in said fluid passage and having a plurality of spaced openings cooperatively arranged for directing drilling fluids in selected fluid paths along said fluid passage, a rotatable flow obstructing member in said fluid passage and having a plurality of alternately distributed angularly spaced openings and obstructions cooperatively arranged to successively cross said fluid paths upon rotation of said flow obstructing member for producing cyclic acoustic signals in drilling fluids flowing through said fluid passage, and motor means adapted for rotating said signal producing member; and
signal responsive coupling means co-rotatively intercoupling said motor means to said signal producing member, said coupling means being operable in response to said digital signals applied thereto for selectively shifting said signal producing member between selected angular orientations during the continued rotation thereof to vary the phase of said acoustic signals in accordance with said digital signals.

25. The apparatus of claim 24 further including: means adapted for connection to the surface end of said drill string for detecting at least changes in the phase of said acoustic signals to provide indications at the surface representative of said downhole condition.

26. The logging-while-drilling apparatus of claim 6 wherein said set speed of said signal generating means is altered for a time period equal to one normal sonic period of said acoustical pressure wave signal.

27. The logging-while-drilling apparatus of claim 8 wherein said shift means includes:
energy storage means for providing energy to assist in effecting said change in said relative speed.

* * * * *